United States Patent [19]

Sakakibara et al.

[11] Patent Number: 4,973,288
[45] Date of Patent: Nov. 27, 1990

[54] BELT DRIVE CONTINUOUSLY VARIABLE SPEED TRANSMISSION

[75] Inventors: Shiro Sakakibara; Masahiro Hasebe; Masashi Hattori, all of Aichi, Japan

[73] Assignee: Aisin AW Kabushiki Kaisha, Japan

[21] Appl. No.: 444,426

[22] Filed: Dec. 1, 1989

[30] Foreign Application Priority Data

Dec. 5, 1988 [JP] Japan .................. 63-308594

[51] Int. Cl.$^5$ ............................................. F16H 11/02
[52] U.S. Cl. .......................................... 474/8; 474/12; 474/28
[58] Field of Search .................... 474/8, 11, 12, 17, 18, 474/19, 25, 69, 70, 28; 74/865-869

[56] References Cited

U.S. PATENT DOCUMENTS

| 4,850,938 | 7/1989 | Yamada | 474/28 |
| 4,884,997 | 12/1989 | Hattori | 474/28 |
| 4,904,229 | 2/1990 | Hattori | 474/12 |

Primary Examiner—Thuy M. Bui
Attorney, Agent, or Firm—Lorusso & Loud

[57] ABSTRACT

A continuously variable belt transmission of the type comprising: primary and secondary pulleys, each of which comprises a pair of axially opposed sheaves supported on a shaft, one of the sheaves being movable and the other being fixed; a belt wound around these pulleys; a pressure adjusting mechanism for imparting to at least one of these pulleys an axial force which corresponds to torque transmitted; and mechanical actuators for axially shifting the movable sheaves of these pulleys, wherein: first thrust bearings are respectively interposed between the backsides of the movable sheaves and one ends of the mechanical actuators; a first automatic aligning mechanism is provided for supporting at least one of the races of each the first thrust bearing; and axial forces occurring at the pulleys are carried by the shafts directly, or via the first thrust bearings, the first automatic aligning mechanisms and the mechanical actuators, or via the pressure adjusting mechanism.

Further, adjustable intermediate members are provided which abut against the other ends of the mechanical actuators and are radially supported on shoulders of a casing, the adjustable intermediate members being adapted to rotatably support the shafts, and wherein second thrust bearings are interposed between the backsides of the adjustable intermediate members and a flange formed on one end of the shaft, at least one of the races of each the second bearing being supported by a second automatic aligning mechanism.

21 Claims, 4 Drawing Sheets

Fig. 4

| POSITION \ ELEMENT | | C1 | C2 | 102 | B1 | B2 | F |
|---|---|---|---|---|---|---|---|
| P | | | | | | | |
| R | | | | | ○ | ○ | |
| N | | | | | | | |
| D | L | ○ | | ○* | | | ○ |
| | H | ○ | ○ | ○* | | | |
| S | L | ○ | | ○* | ○ | | ○ |
| | H | ○ | ○ | ○* | | | |

BELT DRIVE CONTINUOUSLY VARIABLE SPEED TRANSMISSION

BACKGROUND OF THE INVENTION

The present invention relates to belt drive continuously variable speed transmissions (CVT) comprising primary and secondary pulleys each consisting of two sheaves, with a metallic belt or chain wound around the pulleys. More particularly, it relates to arrangements in CVT's of the above-mentioned type for carrying thrusts exerted on the pulleys.

Recently, from viewpoints of fuel consumption rate and others, automatic transmissions of the type incorporating a belt drive continuously variable speed transmission therein have attracted attention as a transmission for use in motor vehicles.

The applicant has already proposed a belt drive continuously variable speed transmission, wherein, as disclosed in Japanese Laid-Open Official Gazette for Patent Application No. 62-13853, the arrangement is such that axial forces corresponding to transmitted torque are imparted to pulleys by means of pressure adjusting cam mechanisms and the effective diameter of the pulleys ar adjusted by ball screw mechanisms.

In this belt drive continuously variable speed transmission, thrust roller bearings are interposed between movable sheaves and ball screw mechanisms, and other thrust roller bearings are interposed between flange portions provided at shaft ends and the opposite ends of the ball screw mechanisms, belt squeezing forces from the pressure adjusting cam mechanisms and the ball screw mechanisms being imparted via these bearings, the axial forces being carried by the tensile force exerted by the shaft.

In the above-mentioned belt drive continuously variable speed transmission, the race position of the thrust bearings is uniquely defined by the precision on the side of the sheave, or the precision of the ball screw mechanisms, so that th ethrust bearings are directly influenced by such supporting members. Therefore, there is a problem in that dispersion of the precision of the supporting members may cause the rollers to abut against the race on a single side, with concentrated loads being applied to part of the bearings, which may largely reduce the durability of the bearings.

Since, in the belt drive continuously variable speed transmission, the movable sheaves are slidably guided on shafts while being influenced by large biasing forces originating from the tension of the belt, it is extremely difficult to maintain the supporting members. i.e. ball screw mechanisms, together with the movable sheave backsides and the flange front sides at a high positional accuracy. Further, in the supporting mechanism comprising a closed loop for carrying the axial forces acting on the pulleys within the shafts, the supporting structure does not have any relief portions so that the above-mentioned positional accuracy will prominently influence the performance of the bearings.

SUMMARY OF THE INVENTION

It is therefore an object of the present invention to provide a belt drive continuously variable speed transmission in which an automatic aligning mechanism is used to prevent the occurrence of one-sided abutment in thrust bearings so as to achieve homogeneous abutment throughout the races thereof, thereby to improve the durability and efficiency of the thrust bearings.

To achieve the above object, the present invention provides a belt drive continuously variable speed transmission of the type comprising: primary and secondary pulleys, each of which comprises a pair of axially opposed sheaves supported on a shaft, one of said sheaves being movable and the other being fixed; a belt wound around these pulleys; a pressure adjusting mechanism for imparting to at least one of these pulleys an axial force which corresponds to torque transmitted; and mechanical actuators, such as, for example, ball screw mechanisms, for axially shifting the movable sheaves of these pulleys, wherein first thrust bearings are respectively interposed between the backsides of said movable sheaves and one ends of said mechanical actuators, at least one (e.g. the one on the side of the actuator) of the races of each said first thrust bearing is supported by a first automatic aligning mechanism, and axial forces occurring at said pulleys are carried by said shafts directly, or via said first thrust bearings, first automatic aligning mechanisms and mechanical actuators, or via said pressure adjusting mechanism.

Further, adjustable intermediate members are provided which abut against the other ends of said mechanical actuators and radially supported by casing shoulders, said shafts being rotatably supported by the adjustable intermediate members, and further second thrust bearings being interposed between the backsides of the adjustable intermediate members and the flanges provided at one ends of said shafts, at least one (e.g. the one on the side of the flange) of the races of each of the second thrust bearings being supported by a second automatic aligning mechanism.

Consequently, rotation of the primary pulley is transmitted to the secondary shaft via the belt and the secondary pulley. The pressure adjusting mechanism will produce an axial force which originates from and corresponds to the torque acting on the primary pulley, for example, and the pulley will squeeze the belt with forces depending on the torque transmitted so that power can be transmitted without slip. The mechanical actuators, activated by means of rotating driving means such as electric motors, will modify the effective diameter of the pulleys, thereby continuously adjusting the transfer torque ratio.

Axial reaction forces exerted from the belt to the primary pulley will act on the shafts firstly through the fixed sheaves and the pressure adjusting mechanisms, on the one hand, and secondly through the movable sheaves, first thrust bearings, first automatic aligning mechanisms and mechanical actuators (and further the adjustable intermediate members, second thrust bearings and second automatic aligning mechanisms) on the other hand, and these axial reaction forces are carried within the shafts and thus will not act on the casing or other elements. Similarly, axial reaction forces exerted from the belt to the secondary pulley will directly act on the shafts firstly through the fixed sheaves, on the one hand, and secondly through the movable sheaves, first thrust bearings, first automatic aligning mechanisms, and mechanical actuators (further, the adjustable intermediate members, second thrust bearings and second automatic aligning mechanisms) on the other hand, and these axial reaction forces are carried within the shafts and thus will not act on the casing or other elements. If there occurs a slight degree of one-sided running of the belt due to dispersion in size or quality of parts or due to biasing forces from the belt, the automatic aligning mechanisms will act to take up unbalanced axial reaction forces acting on the first thrust bearings, whereby axial forces are evenly carried by the first thrust bearings throughout its entire periphery.

BRIEF DESCRIPTION OF THE DRAWINGS

FIG. 4 is a table showing operating states of various elements of the automatic transmission in various positions.

DESCRIPTION OF THE PREFERRED EMBODIMENT

A preferred embodiment of the present invention will now be described in detail with reference to the drawings.

Figure 3:
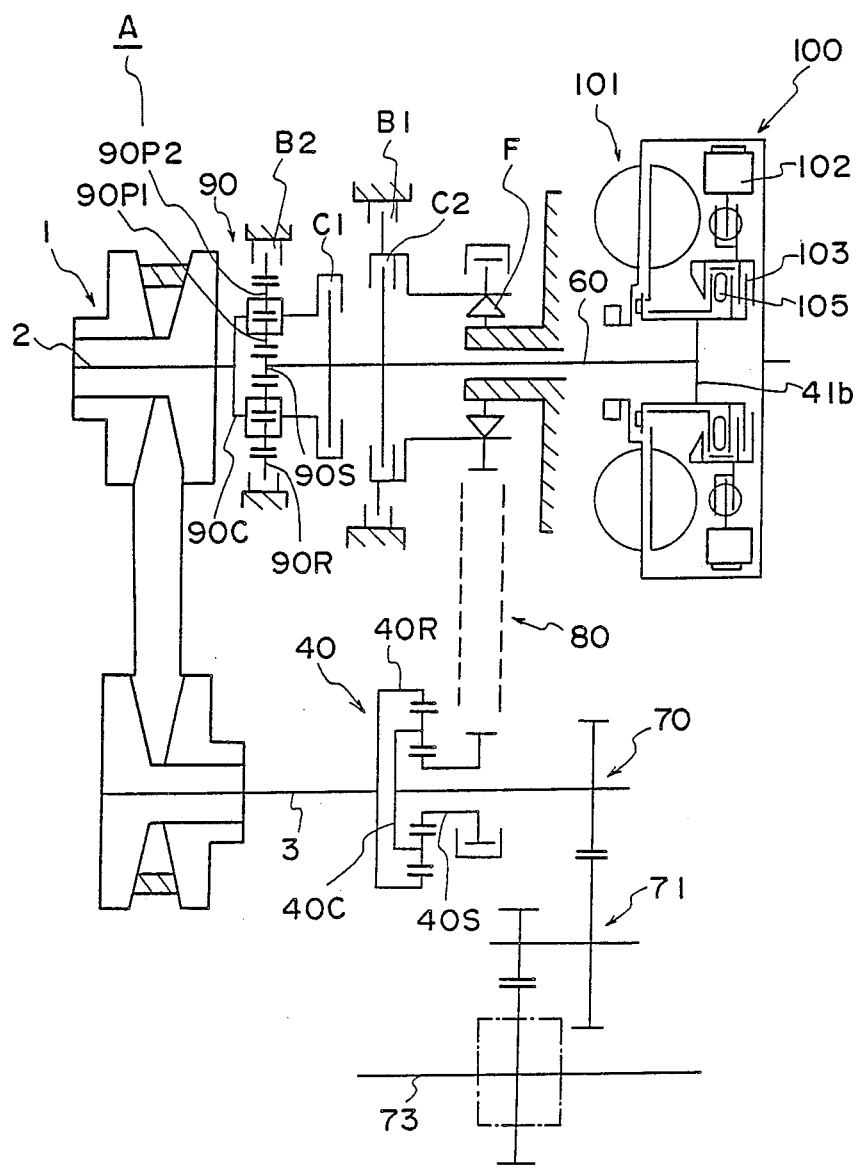
FIG. 3 is a schematic diagram showing the automatic transmission.

A continuously variable speed automatic transmission A shown in FIG. 3 comprises: a belt drive continuously variable speed transmission 1; a single planetary gear mechanism 40; a transfer device 80; an output member 70 comprising a reduction gear device 71 and others; a forward/reverse rotation changeover mechanism comprising a dual planetary gear mechanism 90; and a starting device 100 comprising a fluid coupling 101, a centrifugal lockup clutch 102 and a slip clutch 103.

In the single planetary gear mechanism 40, a ring gear 40R is interlocked to a secondary shaft 3 of the belt drive continuously variable speed transmission 1, a carrier 40C is interlocked to the output member 70, a sun gear 40S is connected via the transfer device 80 to a low one-way clutch F and a low-coast & reverse brake B1, on the one hand, which clutch F and brake B1 comprise locking means, and via a high clutch C2 to an input shaft 60, on the other hand.

In the dual planetary gear mechanism 90 so constructed, a sun gear 90S is connected to the input shaft 60, a carrier 90C is connected to a primary shaft 2 of the belt drive continuously variable speed transmission 1 and, via a forward clutch C1, to the input shaft 60, and a ring gear 90R is connected to a reverse brake B2.

The operation of each of the clutches, brakes and one-way clutch in the continuously variable speed automatic transmission A in various positions is as shown in FIG. 4. In FIG. 4, the symbol '※' indicates that the lockup clutch 102 is operable depending on centrifugal force.

In a low-speed mode L within "D" range, the forward clutch C1 and the low one-way clutch F are engaged. In such state, the rotation of an engine crank is transmitted either via the lockup clutch 102 and the slip clutch 103 or via the fluid coupling 101 to the input shaft 60, and then directly to the sun gear 90S of the dual planetary gear mechanism 90, and via the forward clutch C1 to the carrier 90C. The dual planetary gear mechanism 90 will then rotate with the input shaft 60 so as to transmit positive rotation to the primary shaft 2 of the belt drive continuously variable speed transmission 1. Further, the rotation is transmitted from the secondary shaft 3 to the ring gear 40R of the single planetary gear mechanism 40 after being speed-changed by the belt drive continuously variable speed transmission 1. Meanwhile, in this state, the sun gear 40S on which reaction forces will act is seized by the low one-way clutch F via the transfer device 80. The rotation of the ring gear 40 R is thus taken out through the carrier 40 C as a speed-reduced rotation which is transmitted through the reduction gear device 71 and others to an axle shaft 73.

In a high-speed mode H within the "D" range, the high clutch C2 is engaged in addition to the forward clutch C1. In this state, as in the previous case, rotation is taken out through the secondary shaft 3 after being speed-changed by the belt drive continuously variable speed transmission 1, which rotation is then transmitted to the ring gear 40 R of the single planetary gear mechanism 40. At the same time, on the other hand, the rotation of the input shaft 60 is transmitted to the sun gear 40 S of the single planetary gear mechanism 40 through the engaged forward clutch and the transfer device 80, so that within the planetary gear mechanism 40 the torques of the ring and sun gears 40 R and 40 S are combined and the resultant torque is output through the carrier 40 C. Since rotation against reaction forces is then transmitted through the transfer device 80 to the sun gear 40 S, circulation of torque will not occur and a predetermined positive torque is transferred through the transfer device 80. The above-mentioned resultant torque is transmitted to the axle shaft 73 through the reduction gear device 71 and others.

In the "D" range operation, power is not transmitted under the action of the one-way clutch F when reversed torque is applied (during engine brake), but in "S" range power is also transmitted even when reversed torque is applied since the low-coast & reverse brake B1 is then applied in addition to the low one-way clutch F.

in "R" range, the reverse brake B2 is actuated together with the low-coast & reverse brake B1. The rotation of the input shaft 60 is then input as a reversed rotation through the carrier 90 C to the belt drive continuously variable speed transmission 1 since within the dual planetary gear mechanism 90 the ring gear 90 R is then fixed. The reversed rotation is taken out to the output member 70 after being speed-reduced by the single planetary gear mechanism 40 since the gear 40S of the single planetary gear mechanism 40 is then fixed by the action of the low-coast & reverse brake B1.

An embodiment of the present invention will now be described with reference to FIGS. 2 and 3.

The continuously variable speed automatic transmission A has a casing consisting of three separate parts. On the casing 25, the input shaft 60 and the primary shaft 2 forming in combination a first shaft are coaxially rotatably supported, and the secondary shaft 3 and a gear shaft 70a forming in combination a second shaft are coaxially rotatably supported. On the first shaft, there are provided a starting device 100; an operating section 50 comprising the forward clutch C1, high clutch C2, low-coast & reverse brake B1, reverse brake B2 and low one-way clutch F; the dual planetary gear mechanism 90 which constitutes the forward/reverse rotation changeover mechanism; and a hydraulic pump 61. On the second shaft, there is provided the single planetary gear mechanism 40.

The starting device 100 includes the fluid coupling 101, the lockup clutch 102 consisting of a centrifugal clutch, and a slip clutch 103. The slip clutch 103 has a cam mechanism 105 which produces an axial force corresponding to load torque. The cam mechanism 105 is operable to press against a clutch plate and a disk of the slip clutch 103 and will increase the torque capacity as the load torque increases.

On the side of the input shaft 60 which is adjacent to the engine (not shown), a lug 25a projects from the casing 25. An input sprocket 81 of the transfer device 80 is supported on the lug 25a via a bearing, and a hub of the sprocket 81 is connected to said lug 25 a via the low one-way clutch F. The input shaft 60 is connected to the inner surface of a flange radially outwardly extending from the sprocket 81, and the low-coast & reverse brake B1 consisting of a multiple-disk clutch is interposed between the outer surface of the flange and the casing 25.

The input shaft 60 has the sun gear 90 B of the dual planetary gear mechanism 90 splined-connected to the front end thereof and has a flange radially outwardly extending therefrom. The front end of the input shaft 60 is fitted via a bush into the primary shaft 2 of the belt drive continuously variable speed transmission 1 and thus these shafts 60 and 2 are thereby aligned. The carrier 90 C is spline-connected to the shaft 2. Further, first and second pinions 90 P1 and 90 P2 are supported by the carrier 90 C and have axially outwardly extending connecting members, and the forward clutch C1 consisting of a multiple-disk clutch is interposed between the inner diameter sides and the outer diameter side of the flange extending from said input shaft 60. Between the outer peripheral side of a supporting member which fixes the ring gear 90 R and the casing 25, there is interposed the reverse brake B2 which consists of another multiple-disk brake.

In said operating section 50, an actuator unit 51 is provided, the low-coast & reverse brake B1 and the high clutch C2 being located on one side of the actuator unit 51 and the reverse brake B2 and the forward clutch C1 are located on the opposite side of the actuator unit 51. The actuator unit 51 comprises an actuator unit 51a for a forward/reverse rotation changeover mechanism and another actuator unit 51b for a high/low speed mode changeover mechanism, which are positioned adjacent to each other, and has a motor for the forward-/reverse rotation changeover mechanism and another motor for the high/low speed mode changeover mechanism, which are spaced circumferentially by a predetermined distance. These motors comprise a commutator motor, a rotating-field type motor such as a step motor, and an electric motor such as a servo-motor or ultrasonic motor, and are respectively associated with holding means, comprising an electromagnetic brake, for example, for holding the motors at predetermined rotational positions.

Ball screw mechanisms 52 and 53 for the forward-/reverse rotation changeover mechanism and the high/low speed mode changeover mechanism, respectively, have their female screws fixedly provided on the casing 25, and have their male screws engaged with each other via the output gears of said motors, with a connecting member being connected to each of the male screws. The connecting member connected to the bass screw mechanism 52 for the forward/reverse rotation changeover mechanism will engage said forward clutch C1 when being moved in one axial direction and will engage said reverse brake B2 when being moved in the opposite axial direction. On the other hand, the other connecting member connected to the ball screw mechanism 53 for the high/low speed mode changeover mechanism will engage the high clutch C2 when being moved in one axial direction and will engage said low-coast & reverse brake B1 when being moved in the opposite axial direction.

Figure 1:
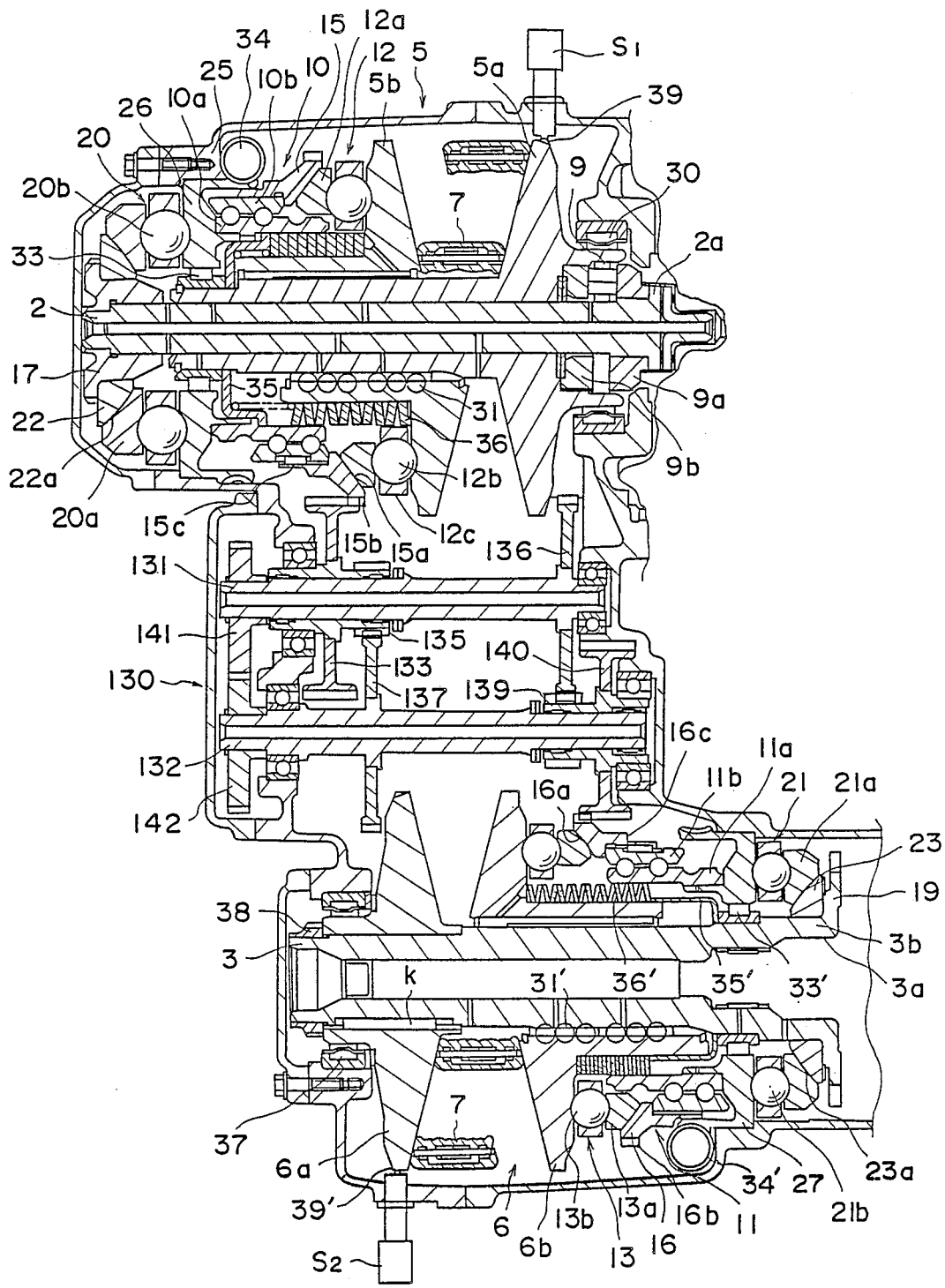
FIG. 1 is a developed sectional view of the belt drive continuously variable speed transmission according to the present invention.
Figure 2:
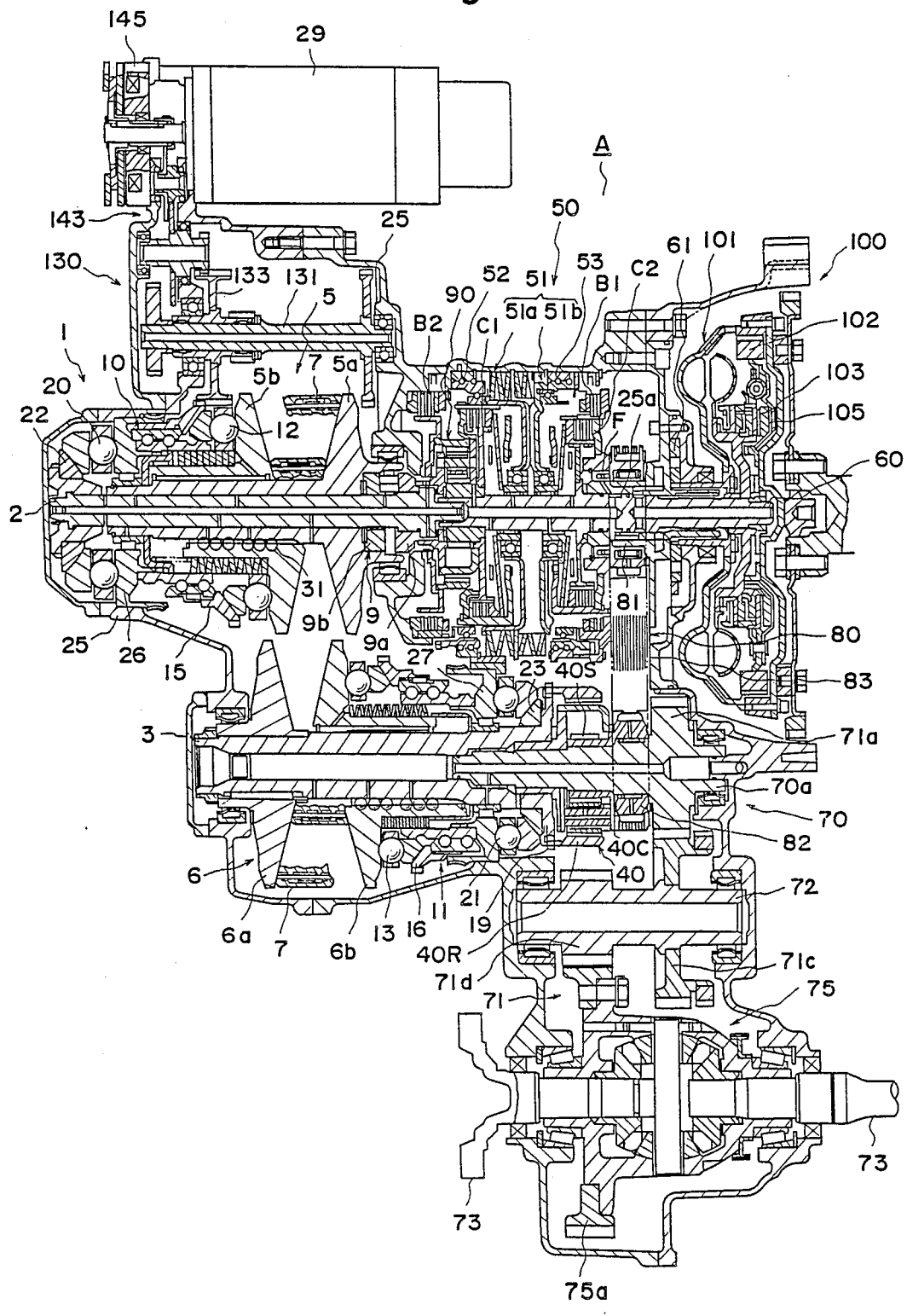
FIG. 2 is an overall sectional view showing an automatic transmission to which the belt drive continuously variable speed transmission is applied.

As shown in FIGS. 1 and 2, the belt drive continuously variable speed transmission 1 comprises a primary pulley 5, a secondary pulley 6 and a belt 7 wound around these pulleys 5 and 6, with each of the pulleys 5 and 6 comprising a fixed sheave 5a, 6a and a movable sheave 5b, 6b. The fixed sheave 5a of the primary pulley 5 is rotatably supported on the casing 25 by means of a roller bearing 30, a pressure adjusting cam mechanism 9 being interposed between the backside of the fixed sheave 5a and a flange 2a which extends radially outwardly from the proximal end of the primary shaft 2. The pressure adjusting cam mechanism 9 generally comprises two portions: a fixed cam portion 9a which is connected through the primary shaft 2 to the carrier 90 C of said dual planetary gear mechanism 90 and which is prevented from moving in axial directions by said flange 2a, and a movable cam portion 9b which is spline-connected to the fixed sheave 5a and which abuts against such sheave 5a via a disc spring, with rollers being interposed between these cam portions 9a and 9b. This mechanism 9 will impart to the fixed sheave 5a an axial force which corresponds to the torque transmitted. The movable sheave 5b is only slidably supported on the hub of the fixed sheave 5a via a ball spline (linear ball bearing) 31, with a ball screw mechanism 10 being provided on the backside thereof.

The ball screw mechanism 10 comprises a male screw portion 10a and a female screw portion 10b, the rear end of the male screw portion 10a being fixed to an adjustable intermediate member 26 which is supported and restrained by a shoulder of the casing 25 from moving in axial and radial directions. The adjustable intermediate member 26 follows the hub of the fixed sheave 5a by means of a roller bearing 33 so as to rotatably support the primary shaft 2, while it engages with a worm 34 such that it is rotated following the operation of the worm 34 so as to rotate the male screw portion 10a into the female screw portion 10b, whereby the initial tension and the running center of the belt 7 can be adjusted. An automatic aligning mechanism 15 is fixed to the female screw portion 10b. A first thrust ball bearing 12 is interposed between the automatic aligning mechanism 15 and the backside of said movable sheave 5b. The thrust ball bearing 12 has a multitude of balls 12 held in a cage 12c which, on one side, directly abut against respective recesses formed in the backside of the movable sheave 5b and, on the opposite side, abut against the race 12a. The race 12a has a spherical convex surface on the opposite side, which surface is in tight contact with a spherical supporting surface 15a of the automatic aligning mechanism 15. The spherical supporting surface forms a concave surface which has a focus located at the center of the primary shaft 2 and which is inclined downward. The automatic aligning mechanism 15 also has a projecting portion which extends obliquely along said spherical supporting surface 15a, a gear portion 15b formed at the distal end of the projecting portion, and a key fixing portion 15c which is fixed to said female screw portion 10b so as to rotate and axially move with the female screw portion 10b.

Between the backside of the movable sheave 5b and a support plate 35 which is prevented from moving in axial directions by the inner race of the roller bearing held by said adjustable intermediate member 26, there an elastic urging member 36 comprising a predetermined number of disc springs, which urging member will carry part of the belt squeezing load so as to reduce the load to be carried by said ball screw mechanism (mechanical actuator) 10 and the bearing 12. A flange 17 is fixedly screwed to the front end of the primary shaft 2 and a second automatic aligning mechanism 22 is fixed to the flange 17. The automatic aligning mechanism 22 provides a convex surface directed obliquely outward and has a spherical supporting surface 22a which has a focus located at a point on an extension of the center line of the shaft 2. Between the automatic aligning mechanism 22 and the backside of said adjustable intermediate member 26, there is interposed a second thrust ball bearing 20, which has a multitude of balls 20b held in a cage as well as a race 20a. The balls 20b directly abut against recesses formed in the backside of the adjustable intermediate member 26, while the race 20a abutting the balls on the opposite side has a spherical concave surface which is in tight contact with the spherical supporting surface 22a of said automatic aligning mechanism 22.

The fixed sheave 6a of the secondary pulley 6 is made integral with the secondary shaft 3 and is rotatably supported on the casing 25 via a roller bearing 37, while the movable sheave 6b is only slidably supported on the secondary shaft 3 via a ball spline 31'.

Further, on the backside of the movable sheave 6b there is arranged a ball screw mechanism 11 whose male screw portion 11a is fixed to an adjustable intermediate member 27 which is similar to said adjustable intermediate member 26. Thus, the adjustable intermediate member 27 will support the secondary shaft 3 via a roller bearing 33' while at the same time will cooperate with said adjustable intermediate member 26 on the side of said primary shaft so as to adjust the initial tension and the running center line of the belt 7 depending on the rotation of the worm 34'. In addition, as on the primary shaft, a (first) automatic aligning mechanism 16 is fixed to the female screw portion 11b of the ball screw mechanism 11, and a (first) thrust ball bearing 13 is interposed between the automatic aligning mechanism 16 and the backside of the movable, sheave 6b. That is, the automatic aligning mechanism 16 has a concave spherical supporting surface 16a having a focus located at the center line of the secondary shaft 3, and further has a projecting portion extending obliquely along the supporting surface 16a, a gear portion 16b formed at the distal end of this projecting portion, and a splined fixing portion 16c. The thrust ball bearing 13 has balls 3b which directly abut against recesses in the backside of the movable sheave 6b and a race 13a which has spherical recesses being in tight contact with said spherical supporting surface 16a. Further, between a supporting plate 35' fixed to the shaft 3 and the backside of the movable sheave 6b, there is provided an elastic urging member 36' which is similar to the one provided on the side of said primary shaft. The secondary shaft 3 is formed with a bore 3a for receiving a gear shaft 70a therein, and the proximal end of the shaft 3 has an enlarged diameter, with the edge of this enlarged-diameter end extending radially outwardly to form a flange 19. To the front end of the shaft 3, the fixed sheave 6a is fitted via a key K and further a nut 38 is screwed for preventing the fixed sheave 6a from being dismounted from the shaft 3. As on the side of the primary shaft, the flange 19 has a (second) automatic aligning mechanism 23 fixed thereto which has a convex spherical supporting surface 23a having a focus located on an extension of the center line of &he shaft 3. Between the automatic aligning mechanism 23 and the backside of said adjustable intermediate member 27, there is interposed a (second) thrust ball bearing 21 which has balls 21b directly abutting against the backside of said adjustable intermediate member 27 as well as a race 21a having a spherical concave surface which is in tight contact with said spherical supporting surface 23a.

In FIG. 1, reference numerals 39 and 39' designate U-shaped grooves formed on top of the fixed sheaves 5a and 6a of the primary and secondary pulleys, respectively, for detection purposes. The number of rotations of the primary and secondary shafts 2 and 3 are detected by electromagnetic sensors $S_1$ and $S_2$ which count the U-shaped grooves 39 and 39', respectively.

An operating device 130 is provided where a triangle is formed by the primary and secondary shafts 2 and 3. The operating device 130 includes first and second operating shafts 131 and 132 supported on the casing 25. A boss having large and small gears 133 and 135 is rotatably supported on the first operating shaft 131, and another large gear 136 is integrally fixed with the same shaft 131. The second operating shaft 132, on the other hand, has another large gear 137 integrally fixed therewith and a boss rotatably supported thereon which has small and large gears 139 and 140. The small and large gears 135 and 136 on the first operating shaft 131 are engaged with the large and small gears 137 and 139 on the second operating shaft 132, respectively.

The operating shafts 131 and 132 have non-circular mutually engaging gears 141 and 142, respectively, fixed at their front end portions projecting the bearing which support them, whereby they are interlocked together in a non-linear relation. The large gear 133 on the first operating shaft 131 is engaged with a gear portion 15b formed on the (first) automatic aligning mechanism 15 on the side of the primary pulley, while the large gear 140 on the second operating shaft 132 is engaged with a gear portion 16b formed on the automatic aligning mechanism 16 on the side of said secondary pulley. As shown in FIG. 2, the large gear 133 on the first operating shaft 131 is engaged with a reduction gear mechanism 143 on the side thereof which is opposite to the side where it meshes with said gear portion, the reduction gear mechanism 143 comprising a multitude of spur gears and meshing with the output gear of an electric motor 29. The electric motor 29, like those previously mentioned in connection with the aforementioned operating section 50, is associated with an electromagnetic brake 145 which can hold the motor 29 at predetermined positions.

As shown in FIG. 2, the single planetary gear mechanism 40 is arranged on the gear shaft 70a which constitutes the second shaft, and its ring gear 40 R is connected to the flange on the secondary shaft 3 of the belt drive continuously variable speed transmission 1. The gear shaft 70a has a sprocket 82 integral with the sun gear 40 S rotatably supported thereon and has the carrier 40 C fixed thereto which rotatably supports a pinion 40p.

A silent chain 83 is wound around the sprocket 82 integral with the sun gear 40 S on the second shaft and the sprocket 81 supported on said low one-way clutch F. These sprockets 81 and 82 and chain 83 constitute the transfer device 80.

Said gear shaft 70a, in combination with a gear 71a provided integral therewith, forms the output member 70, and the gear 71a meshes with a gear 71c fixed on an intermediate shaft 72. The intermediate shaft 72 is formed with a small gear 71d which meshes with a ring gear 75a fixed to a differential gear device 75, forming a reduction gear device 71. From the differential gear device 75, right and left front axles 73 extend.

The operation of the embodiment will now be described.

The rotation of the engine crank shaft is transmitted to the input shaft 60 via the fluid coupling 101 when the vehicle having the described transmission mounted thereon; subsequently, however, the rotation is transmitted to the input shaft 60 via the centrifugal lockup clutch 102 and the slip clutch 103. The forward/reverse rotation changeover mechanism consisting of the dual planetary gear mechanism 90 set to its forward or backward position by the actuator 51a of the operating section 50 which engages either the forward clutch Cl or the reverse brake B2, will transmit the rotation of the input shaft to the fixed cam portion 9a of the pressure adjusting cam mechanism 9 as a positive or reversed (or forward or backward) rotation. The high/low speed mode changeover mechanism consisting of the single planetary gear mechanism 40 may be switched between the high and low speed modes "H" and "L" by actuating the actuator 51b of the operating section 50 to engage the high clutch C2 or low-coast & reverse brake B1, on the one hand, and engage the low one-way clutch F or allow this clutch F to overrun, on the other hand.

The torque transmitted to the fixed cam portion 9a of the pressure adjusting cam mechanism 9 is transmitted to the movable sheave 5b of the primary pulley 5 via rollers and the movable cam portion 9b and will impart to the fixed sheave 5a an axial force corresponding to the transmitted torque, whereby an axial force corresponding to the transmitted torque is imparted to the entire belt drive continuously variable speed transmission 1 which is associated therewith through the belt 7. The torque is transmitted from the fixed sheave 5a through the ball spline 31 to the movable sheave 5b, and further to the secondary pulley through the belt 7 which is then squeezed by the axial force corresponding to the axial force imparted by the pressure adjusting cam mechanism 9. Axial reacting forces will then be exerted on the fixed and movable sheaves 5a and 5b by the belt 7, the axial force from the fixed sheave 5a being carried by the flange 2a of the shaft through the pressure adjusting cam mechanism 9. In addition, the axial force from the movable sheave 5b is carried by the flange 17 fixed to the shaft 2 through the thrust ball bearing 12, automatic aligning mechanism 15, ball screw mechanism 10 in a predetermined position, adjustable intermediate member 26, thrust ball bearing 20 and automatic aligning mechanism 22, whereby the axial forces are born by a closed loop acting as tensile stresses on the primary shaft 2. Part of the axial force acting on the movable sheave 5 b is transmitted from the backside thereof through the supporting plate 35 and is directly carried by the primary shaft 2, whereby the axial forces acting on the thrust ball bearings 12 and 20 and the ball screw mechanism 10 are reduced.

When one sided-positioning occurs on the movable sheave 5b due to the action of a biasing force from the belt 7 which can arise from slight dispersion in size, for example, of parts or from backlash in fitting parts, automatic adjustment is effected for the race 12a by the spherical supporting surface 15a of the aligning mechanism 15 so that the balls 12b of the thrust ball bearing 12 can abut homogeneously throughout the backside of the fixed sheave 5b. Further, unlike the case of rollers, differences in "abutting diameter" of the balls 12b of the ball bearing 12 will not result in significant differences in their peripheral speed because they are spherical, so that relative sliding movement between the balls 12b and the fixed sheave 5a can be eliminated or reduced. The elimination of or reduction in such relative sliding, in combination with the prevention of the single-sided abutment of the balls 12b, will allow the bearing 12 to have a significantly prolonged life.

Similarly, if one sided positioning of the primary shaft 2 occurs relative to the adjustable intermediate member 26 supported on a shoulder of the casing 25, automatic aligning is effected for the race 20a by the spherical supporting surface 22a of the automatic aligning mechanism 22 so that the balls 20b of the thrust ball bearing 20 can abut homogeneously throughout the backside of the adjustable intermediate member 26. There is virtually no slide between the balls 20b and the adjustable intermediate member 26. Thus, such automatic aligning and absence of slide will allow the bearing 20 to have a significantly prolonged life.

Torque is transmitted from the belt 7 to the secondary pulley 6, and then to the secondary shaft 3 through the key K and the ball spline 31'. On the secondary shaft 3, the axial reaction force acting on the fixed sheave 6a is directly carried by the shaft 3 by means of the nut 38, while the axial reaction force acting on the movable sheave 6b is carried by the thrust ball bearing 13, ball screw mechanism 11, adjustable intermediate member 27, thrust ball bearing 21 and flange 19, in a manner similar to the case of the primary one. Similarly, part of the axial force acting on the movable sheave 6b is carried by the secondary shaft 3 directly via the elastic urging member 36' and the supporting plate 35'.

If one-sided positioning of the movable sheave 6b occurs, the thrust ball bearing 13 is automatically aligned by the automatic aligning mechanism 16 so that the balls 13b can homogeneously abut against the fixed sheave 6a through out the backside thereof, in a manner similar to the case of the primary one. Also, if one-sided positioning of the secondary shaft 3 occurs relative to the adjustable intermediate member 27 supported on a shoulder of the casing 25, the thrust ball bearing 21 is automatically aligned by the automatic aligning mechanism 23 so that the balls 21b can abut against the adjustable intermediate member 27 throughout the backside thereof.

When the electric motor 29 is rotated in accordance with a speed-changing command from a controller (not shown). the large gear 133 fitted on the first operating shaft 131 is rotated through the reduction gear mechanism 143, whereby the automatic aligning mechanism 15 and the female screw portion 10b integral therewith are rotated by means of the gear portion 15b meshing with such gear 133. The female screw portion 10b will then be shifted axially relative to the male screw portion 10a which is prevented from rotating by the adjustable intermediate member 26, thereby to shift the movable sheave 5b through the thrust ball bearing 12 and thus modifying the effective diameter of the primary pulley 5 for the belt.

The rotation of said large gear 133 is transmitted to the second operating shaft 132 after being substantially speed-reduced by the small and large gears 135 and 137 meshing together, and from there it is further transmitted to the first operating shaft 131 through the non-circular gears 141 and 142. The rotation of the first operating shaft 131 is increased in speed by the large gear 136, small gear 139 and another large gear 140, and the rotation is transmitted from the large gear 140 to the gear portion 16b of the automatic aligning mechanism 16 on the secondary shaft. The female screw portion 11b integral with the gear portion 16b will rotate with such gear portion 16b relative to the fixed male screw portion 11a so as to shift axially, thereby moving the movable sheave 6b through the thrust ball bearing 13, whereby the effective diameter of the secondary pulley 6 is modified for the belt. Although the distance to which the primary and secondary pulleys 5, 6 will then shift does not linearly correspond to the distance to which the belt 7 sifts, the difference between these distances can be properly compensated for by the transmission of motion through said non-circular gears 141 and 142. For structural reasons, the rotation of these non-circular gears 141 and 142 are limited to one complete rotation. By providing the non-circular gears 141 and 142 on the speed-reduced first and second operating shafts 131 and 132 which can rotate only within a range of 360°, speed-increased rotation can be transmitted to the gear portions 15b and 16b of the primary and secondary shafts, whereby the ball screws can rotate a number of complete rotations. The ball screw mechanisms 10 and 11 can achieve a predetermined stroke with a predetermined lead.

The rotation of the secondary shaft 3 is transmitted from its flange 19 to the ring gear 40R of the single planetary gear mechanism 40, where it is either speed-reduced or simply combined with the rotation transferred thereto by the transfer device 80, and the thus obtained rotation is transmitted to the gear shaft 70a. The rotation of this gear shaft 70a is in turn transmitted to the differential gear device 75 through the reduction gear device 71 and further to the right and left front axles 73.

The embodiment described and shown is applied to a continuously variable speed automatic transmission A in which the belt drive continuously variable speed transmission 1 is combined with a single planetary gear mechanism 40 for changing between a low speed mode and a high speed mode. The embodiment however is also applicable to automatic transmissions of other types, for example, one in which the belt drive continuously variable speed transmission 1 is combined with a torque converter.

In the described example, ball bearings are used as the thrust bearings but roller bearings may be used instead. Further, in the described example, the adjustable intermediate members 26 and 27, thrust ball bearings 20 and 21, and automatic aligning mechanisms 22 and 23 may be omitted, and the invention can be applied only to either one of the primary or secondary shaft. Also, the automatic aligning mechanisms 15 and 16 may be arranged on the movable sheaves 5b and 6b.

As described, in accordance with the present invention, axial forces occurring at the primary and secondary pulleys 5 and 6 are carried by the primary and secondary shafts 2 and 3. Therefore, it allows the casing to be not so robust as that which is adapted to carry extremely large axial forces for maintaining belt-squeezing forces, whereby significant in weight and simplification of structure can be achieved. Further, in accordance with the invention, the thrust ball bearings 12 and 13 arranged on the backsides of the movable sheaves 5b and 6b are supported by the automatic aligning mechanisms 15 and 16, the structure is a closed loop wherein the above-mentioned axial forces are carried by the shafts, and the accuracy of the thrust ball bearings are largely influenced by the structure, but errors in accuracy of the bearings arising from one-sided positioning of the primary and secondary pulleys 5 and 6, for example, may be taken up by the automatic aligning mechanisms 15 and 16. In other words, one-sided abutment of the thrust ball bearings 12 and 13 can be prevented and even abutment can be achieved throughout the entire peripheries thereof, whereby the thrust ball bearings 12 and 13 may be improved in terms of their durability and efficiency.

In addition, the thrust ball bearings 20 and 21 and automatic aligning mechanisms 22 and 23 are interposed between the adjustable intermediate members 26 and 27 and the flanges 17 and 19 of the shafts 2 and 3 to take up errors in accuracy of the shaft 2 and 3 arising from one-sided positioning relative to the adjustable intermediate members 26 and 27, whereby the thrust ball bearings 20 and 21 may also be improved in terms of their durability and efficiency.

When the thrust bearings 12, 13, 20 and 21 are formed by thrust ball bearings, peripheral speed differences due to radial positions (such differences can occur where roller bearings are used) or relative sliding between the balls and contacting surfaces can be avoided, whereby the thrust bearings 12, 13, 20 and 21 can be improved in terms of their durability and efficiency.

Further, when the automatic aligning mechanisms 15 and 16 are arranged to support races 12a and 13a of the thrust ball bearings 12 and 13 which are located adjacent to the mechanical actuators 10 and 11, respectively, screw portions 15b and 16b for mechanical actuators can be formed at the ends of projections which project along recesses formed by the spherical supporting surfaces 15a and 16a of the automatic aligning mechanisms 15 and 16, whereby available space can be efficiently used to render the belt drive continuously variable speed transmission 1 more compact, in particular in relation to axial directions.

Further, when the automatic aligning mechanisms 22 and 23 are arranged to support the races 20a and 21a of the bearings which are located adjacent to the flanges 17 and 19, respectively, these aligning mechanisms 22 and 23 may be of a construction in which their spherical supporting surfaces 22a and 23a are convex surfaces which have a relatively small radial size, whereby the belt drive continuously variable speed transmission 1 can similarly be rendered more compact, in particular in relation to axial directions.

What we claim is:

1. A belt drive continuously variable speed transmission comprising, within a casing:
    primary and secondary pulleys, each pulley comprising a pair of axially opposed sheaves supported on a shaft, one of said sheaves of each pair being movable and the other being fixed;
    a belt wound around said pulleys;
    a pressure adjusting mechanism for imparting an axial force to at least one of said pulleys, said axial force corresponding to torque transmitted; mechanical actuators for axially shifting said movable sheaves of said pulleys;
    first thrust bearings having plural races and respectively interposed between said movable sheaves and first ends of said mechanical actuators;

a first automatic aligning mechanism for supporting at least one of the races of each said first thrust bearings; and wherein axial forces occurring at said pulleys are carried by said shafts via said first thrust bearings, said first automatic aligning mechanism and said mechanical actuators.

2. A belt drive continuously variable speed transmission comprising:

primary and secondary pulleys, each pulley comprising a pair of axially opposed sheaves supported on a shaft, one of said sheaves of each pair being movable and the other being fixed;

a belt wound around said pulleys;

a pressure adjusting mechanism for imparting an axial force to at least one of said pulleys, said axial force corresponding to torque transmitted;

mechanical actuators for axially shifting said movable sheaves of said pulleys;

first thrust bearings having plural races and respectively interposed between said movable sheaves and first ends of said mechanical actuators;

a first automatic aligning mechanism for supporting at least one of the races of each said first thrust bearings; and wherein axial forces occurring at said pulleys are carried by said shafts via said pressure adjusting mechanism.

3. A belt drive continuously variable speed transmission comprising:

primary and secondary pulleys, each pulley comprising a pair of axially opposed sheaves supported on a shaft, one of said sheaves of each pair being movable and the other being fixed;

a belt wound around said pulleys;

a pressure adjusting mechanism for imparting an axial force to at least one of said pulleys, said axial force corresponding to torque transmitted;

mechanical actuators for axially shifting said movable sheaves of said pulleys;

first thrust bearings having plural races and respectively interposed between said movable sheaves and first ends of said mechanical actuators, a first automatic aligning mechanical for supporting at least one of the races of each said first thrust bearing, and wherein axial forces occurring at said pulleys are directly carried by said shafts.

4. The belt drive continuously variable speed transmission as claimed in claim 1, further comprising:

adjustable intermediate members which abut against second ends of said mechanical actuators and which are radially supported on shoulders of the casing the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

5. The belt drive continuously variable speed transmission as claimed in claim 2, further comprising;

adjsutable intermediate members which abut against second ends of said mechanical actuators and which are radially supported on shoulders of the casing, the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

6. The belt drive continuously variable speed transmission as claimed in claim 3, further comprising:

adjustable intermediate members which abut against second ends of said mechanical actuators and which are radially supported on shoulders of the casing, the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

7. The belt drive continuously variable speed transmission as claimed in claim 1, wherein said first thrust bearings are thrust ball bearings.

8. A belt drive continuously variable speed transmission comprising:

primary and secondary pulleys, each pulley comprising a pair of axially opposed sheaves supported on a shaft, one of said sheaves of each pair being movable and the other being fixed;

a belt wound around said pulleys;

a pressure adjusting mechanism for imparting an axial force to at least one of said pulleys, said axial force corresponding to torque transmitted;

mechanical actuators for axially shifting said movable sheaves of said pulleys;

first thrust bearings having plural races and respectively interposed between said movable sheaves and first ends of said mechanical actuators;

a first automatic aligning mechanism for supporting at least one of the races of each said first thrust bearings; and wherein axial forces occurring at said pulleys are carried by said shafts via said pressure adjusting mechanism.

9. The belt drive continuously variable speed transmission as claimed in claim 8, further comprising:

adjustable intermediate members which abut against second ends of said mechanical actuators and which are radially supported on shoulders of the casing, the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

10. The belt drive continuously variable speed transmission as claimed in claim 9, wherein said second automatic aligning mechanism support the races of said bearings which are located adjacent to the flanges, and wherein said second automatic aligning mechanisms have convex supporting surfaces.

11. The belt drive continuously variable speed transmission as claimed in claim 9, wherein said second thrust bearings are thrust ball bearings.

12. The belt drive continuously variable speed transmission as claimed in claim 8, wherein said first thrust bearings are thrust ball bearings.

13. The belt drive continuously variable speed transmission as claimed in claim 2, wherein said first automatic aligning mechanism support the races of said bearings which are located adjacent to said mechanical actuators, and wherein said first automatic aligning mechanism have concave spherical supporting surfaces.

14. The belt drive continuously variable speed transmission as claimed in claim 8, wherein said mechanical actuators are ball screw mechanisms.

15. A belt drive continuously variable speed transmission comprising:
   primary and secondary pulleys, each pulley comprising a pair of axially opposed sheaves supported on a shaft, one of said sheaves of each pair being movable and the other being fixed;
   a belt wound around said pulleys;
   a pressure adjusting mechanism for imparting an axial force to at least one of said pulleys, said axial force corresponding to torque transmitted;
   mechanical actuators for axially shifting said movable sheaves of said pulleys;
   first thrust bearings having plural races and respectively interposed between said movable sheaves and first ends of said mechanical actuators,
   a first automatic aligning mechanism for supporting at least one of the races of each said first thrust bearing, and wherein
   axial forces occurring at said pulleys are directly carried by said shafts.

16. The belt drive continuously variable speed transmission as claimed in claim 15, further comprising:
   adjustable intermediate members which abut against second ends of said mechanical actuators and which are radially supported on shoulders of the casing, the adjustable intermediate members rotatably supporting the shafts;
   a flange at one end of each shaft;
   second thrust bearings, each having a plurality of races and being interposed between the adjustable intemperate members and a flange; and,
   a second automatic aligning mechanism supporting at least one of the races of each said second bearing.

17. The belt drive continuously variable speed transmission as claimed in claim 16, wherein said second thrust bearings are thrust ball bearings.

18. The belt drive continuously variable speed transmission as claimed in claim 16, wherein said second automatic aligning mechanisms support but races of said bearings which are located adjacent to the flanges, and wherein said second automatic aligning mechanisms have convex spherical supporting surfaces.

19. The belt drive continuously variable speed transmission as claimed in claim 15, wherein said first thrust bearings are thrust ball bearings.

20. The belt drive continuously variable speed transmission as claimed in claim 15, wherein said mechanical actuators are ball screw mechanisms.

21. The belt drive continuously variable speed transmission as claimed in claim 15, wherein said first automatic aligning mechanism support the races of said bearings which are located adjacent to said mechanical actuators, and wherein said first automatic aligning mechanisms have concave spherical supporting surfaces.

* * * * *

UNITED STATES PATENT AND TRADEMARK OFFICE
CERTIFICATE OF CORRECTION

Page 1 of 9

PATENT NO. : 4,973,288

DATED : November 27, 1990

INVENTOR(S) : Shiro Sakakibara et al

It is certified that error appears in the above-identified patent and that said Letters Patent is hereby corrected as shown below:

COLUMNS 1-16
should be deleted and replaced with the
attached columns 1-16.

Signed and Sealed this

Thirteenth Day of October, 1992

Attest:

DOUGLAS B. COMER

*Attesting Officer*  *Acting Commissioner of Patents and Trademarks*

BELT DRIVE CONTINUOUSLY VARIABLE SPEED TRANSMISSION

BACKGROUND OF THE INVENTION

The present invention relates to belt drive continuously variable speed transmissions (CVT) comprising primary and secondary pulleys each consisting of two sheaves, with a metallic belt or chain wound around the pulleys. More particularly, it relates to arrangements in CVT's of the above-mentioned type for carrying thrusts exerted on the pulleys.

Recently, from viewpoints of fuel consumption rate and others, automatic transmissions of the type incorporating a belt drive continuously variable speed transmission therein have attracted attention as a transmission for use in motor vehicles.

The applicant has already proposed a belt drive continuously variable speed transmission, wherein, as disclosed in Japanese Laid-Open Official Gazette for Patent Application No. 62-13853, the arrangement is such that axial forces corresponding to transmitted torque are imparted to pulleys by means of pressure adjusting cam mechanisms and the effective diameter of the pulleys are adjusted by ball screw mechanisms.

In this belt drive continuously variable speed transmission, thrust roller bearings are interposed between movable sheaves and ball screw mechanisms, and other thrust roller bearings are interposed between flange portions provided at shaft ends and the opposite ends of the ball screw mechanisms, belt squeezing forces from the pressure adjusting cam mechanisms and the ball screw mechanisms being imparted via these bearings, the axial forces being carried by the tensile force exerted by the shaft.

In the above-mentioned belt drive continuously variable speed transmission, the race position of the thrust bearings is uniquely defined by the precision on the side of the sheave, or the precision of the ball screw mechanisms, so that the thrust bearings are directly influenced by such supporting members. Therefore, there is a problem in that dispersion of the precision of the supporting members may cause the rollers to abut against the race on a single side, with concentrated loads being applied to part of the bearings, which may largely reduce the durability of the bearings.

Since, in the belt drive continuously variable speed transmission, the movable sheaves are slidably guided on shafts while being influenced by large biasing forces originating from the tension of the belt, it is extremely difficult to maintain the supporting members, i.e. ball screw mechanisms, together with the movable sheave backsides and the flange front sides at a high positional accuracy. Further, in the supporting mechanism comprising a closed loop for carrying the axial forces acting on the pulleys within the shafts, the supporting structure does not have any relief portions so that the above-mentioned positional accuracy will prominently influence the performance of the bearings.

SUMMARY OF THE INVENTION

It is therefore an object of the present invention to provide a belt drive continuously variable speed transmission in which an automatic aligning mechanism is used to prevent the occurrence of one-sided abutment in thrust bearings so as to achieve homogeneous abutment throughout the races thereof, thereby to improve the durability and efficiency of the thrust bearings.

To achieve the above object, the present invention provides a belt drive continuously variable speed transmission of the type comprising: primary and secondary pulleys, each of which comprises a pair of axially opposed sheaves supported on a shaft, one of said sheaves being movable and the other being fixed; a belt wound around these pulleys; a pressure adjusting mechanism for imparting to at least one of these pulleys an axial force which corresponds to torque transmitted; and mechanical actuators, such as, for example, ball screw mechanisms, for axially shifting the movable sheaves of these pulleys, wherein first thrust bearings are respectively interposed between the backsides of said movable sheaves and one ends of said mechanical actuators, at least one (e.g. the one on the side of the actuator) of the races of each said first thrust bearing is supported by a first automatic aligning mechanism, and axial forces occurring at said pulleys are carried by said shafts directly, or via said first thrust bearings, first automatic aligning mechanisms and mechanical actuators, or via said pressure adjusting mechanism.

Further, adjustable intermediate members are provided which abut against the other ends of said mechanical actuators and radially supported by casing shoulders, said shafts being rotatably supported by the adjustable intermediate members, and further second thrust bearings being interposed between the backsides of the adjustable intermediate members and the flanges provided at one ends of said shafts, at least one (e.g. the one on the side of the flange) of the races of each of the second thrust bearings being supported by a second automatic aligning mechanism.

Consequently, rotation of the primary pulley is transmitted to the secondary shaft via the belt and the secondary pulley. The pressure adjusting mechanism will produce an axial force which originates from and corresponds to the torque acting on the primary pulley, for example, and the pulley will squeeze the belt with forces depending on the torque transmitted so that power can be transmitted without slip. The mechanical actuators, activated by means of rotating driving means such as electric motors, will modify the effective diameter of the pulleys, thereby continuously adjusting the transfer torque ratio.

Axial reaction forces exerted from the belt to the primary pulley will act on the shafts firstly through the fixed sheaves and the pressure adjusting mechanisms, on the one hand, and secondly through the movable sheaves, first thrust bearings, first automatic aligning mechanisms and mechanical actuators (and further the adjustable intermediate members, second thrust bearings and second automatic aligning mechanisms) on the other hand, and these axial reaction forces are carried within the shafts and thus will not act on the casing or other elements. Similarly, axial reaction forces exerted from the belt to the secondary pulley will directly act on the shafts firstly through the fixed sheaves, on the one hand, and secondly through the movable sheaves, first thrust bearings, first automatic aligning mechanisms, and mechanical actuators (further, the adjustable intermediate members, second thrust bearings and second automatic aligning mechanisms) on the other hand, and these axial reaction forces are carried within the shafts and thus will not act on the casing or other elements. If there occurs a slight degree of one-sided running of the belt due to dispersion in size or quality of parts or due to biasing forces from the belt, the automatic aligning mechanisms will act to take up unbalanced axial reaction forces acting on the first thrust bearings, whereby axial forces are evenly carried by the first thrust bearings throughout its entire periphery.

BRIEF DESCRIPTION OF THE DRAWINGS

FIG. 1 is a developed sectional view of the belt drive continuously variable speed transmission according to the present invention;

FIG. 2 is an overall sectional view showing an automatic transmission to which the belt drive continuously variable speed transmission is applied;

FIG. 3 is a schematic diagram showing the automatic transmission; and

FIG. 4 is a table showing operating states of various elements of the automatic transmission in various positions.

DESCRIPTION OF THE PREFERRED EMBODIMENT

A preferred embodiment of the present invention will now be described in detail with reference to the drawings.

A continuously variable speed automatic transmission A shown in FIG. 3 comprises: a belt drive continuously variable speed transmission 1; a single planetary gear mechanism 40; a transfer device 80; an output member 70 comprising a reduction gear device 71 and others; a forward/reverse rotation changeover mechanism comprising a dual planetary gear mechanism 90; and a starting device 100 comprising a fluid coupling 101, a centrifugal lockup clutch 102 and a slip clutch 103.

In the single planetary gear mechanism 40, a ring gear 40R is interlocked to a secondary shaft 3 of the belt drive continuously variable speed transmission 1, a carrier 40C is interlocked to the output member 70, a sun gear 40S is connected via the transfer device 80 to a low one-way clutch F and a low-coast & reverse brake B1, on the one hand, which clutch F and brake B1 comprise locking means, and via a high clutch C2 to an input shaft 60, on the other hand.

In the dual planetary gear mechanism 90 so constructed, a sun gear 90S is connected to the input shaft 60, a carrier 90C is connected to a primary shaft 2 of the belt drive continuously variable speed transmission 1 and, via a forward clutch C1, to the input shaft 60, and a ring gear 90R is connected to a reverse brake B2.

The operation of each of the clutches, brakes and one-way clutch in the continuously variable speed automatic transmission A in various positions is as shown in FIG. 4. In FIG. 4, the symbol "✻" indicates that the lockup clutch 102 is operable depending on centrifugal force.

In a low-speed mode L within "D" range, the forward clutch C1 and the low one-way clutch F are engaged. In such state, the rotation of an engine crank is transmitted either via the lockup clutch 102 the slip clutch 103 or via the fluid coupling 101 to the input shaft 60, and then directly to the sun gear 90S of the dual planetary gear mechanism 90, and via the forward clutch C1 to the carrier 90C. The dual planetary gear mechanism 90 will then rotate with the input shaft 60 so as to transmit positive rotation to the primary shaft 2 of the belt drive continuously variable speed transmission 1. Further, the rotation is transmitted from the secondary shaft 3 to the ring gear 40R of the single planetary gear mechanism 40 after being speed-changed by the belt drive continuously variable speed transmission 1. Meanwhile, in this state, the sun gear 40S on which reaction forces will act is seized by the low one-way clutch F via the transfer device 80. The rotation of the ring gear 40R is thus taken out through the carrier 40C as a speed-reduced rotation which is transmitted through the reduction gear device 71 and others to an axle shaft 73.

In a high-speed mode H within the "D" range, the high clutch C2 is engaged in addition to the forward clutch C1. In this state, as in the previous case, rotation is taken out through the secondary shaft 3 after being speed-changed by the belt drive continuously variable speed transmission 1, which rotation is then transmitted to the ring gear 40R of the single planetary gear mechanism 40. At the same time, on the other hand, the rotation of the input shaft 60 is transmitted to the sun gear 40S of the single planetary gear mechanism 40 through the engaged forward clutch and the transfer device 80, so that within the planetary gear mechanism 40 the torques of the ring and sun gears 40R and 40S are combined and the resultant torque is output through the carrier 40C. Since rotation against reaction forces is then transmitted through the transfer device 80 to the sun gear 40S, circulation of torque will not occur and a predetermined positive torque is transferred through the transfer device 80. The above-mentioned resultant torque is transmitted to the axle shaft 73 through the reduction gear device 71 and others.

In the "D" range operation, power is not transmitted under the action of the one-way clutch F when reversed torque is applied (during engine brake), but in "S" range power is also transmitted even when reversed torque is applied since the low-coast & reverse brake B1 is then applied in addition to the low one-way clutch F.

In "R" range, the reverse brake B2 is actuated together with the low-coast & reverse brake B1. The rotation of the input shaft 60 is then input as a reversed rotation through the carrier 90C to the belt drive continuously variable speed transmission 1 since within the dual planetary gear mechanism 90 the ring gear 90R is then fixed. The reversed rotation is taken out to the output member 70 after being speed-reduced by the single planetary gear mechanism 40 since the gear 40S of the single planetary gear mechanism 40 is then fixed by the action of the low-coast & reverse brake B1.

An embodiment of the present invention will now be described with reference to FIGS. 2 and 3.

The continuously variable speed automatic transmission A has a casing 25 consisting of three separate parts. On the casing 25, the input shaft 60 and the primary shaft 2 forming in combination a first shaft are coaxially rotatably supported, and the secondary shaft 3 and a gear shaft 70a forming in combination a second shaft are coaxially rotatably supported. On the first shaft, there are provided a starting device 100; an operating section 50 comprising the forward clutch C1, high clutch C2, low-coast & reverse brake B1, reverse brake B2 and low one-way clutch F; the dual planetary gear mechanism 90 which constitutes the forward/reverse rotation changeover mechanism; and a hydraulic pump 61. On the second shaft, there is provided the single planetary gear mechanism 40.

The starting device 100 includes the fluid coupling 101, the lockup clutch 102 consisting of a centrifugal clutch, and a slip clutch 103. The slip clutch 103 has a cam mechanism 105 which produces an axial force corresponding to load torque. The cam mechanism 105 is operable to press against a clutch plate and a disk of the slip clutch 103 and will increase the torque capacity as the load torque increases.

On the side of the input shaft 60 which is adjacent to the engine (not shown), a lug 25a projects from the casing 25. An input sprocket 81 of the transfer device 80 is supported on the lug 25a via a bearing, and a hub of the sprocket 81 is connected to said lug 25a via the low one-way clutch F. The input shaft 60 is connected to the inner surface of a flange radially outwardly extending from the sprocket 81, and the low-coast & reverse brake B1 consisting of a multiple-disk clutch is interposed between the outer surface of the flange and the casing 25.

The input shaft 60 has the sun gear 90S of the dual planetary gear mechanism 90 splined-connected to the front end thereof and has a flange radially outwardly extending therefrom. The front end of the input shaft 60 is fitted via a bush into the primary shaft 2 of the belt drive continuously variable speed transmission 1 and thus these shafts 60 and 2 are thereby aligned. The carrier 90C is spline-connected to the shaft 2. Further, first and second pinions 90P1 and 90P2 are supported by the carrier 90C and have axially outwardly extending connecting members, and the forward clutch C1 consisting of a multiple-disk clutch is interposed between the inner diameter sides and the outer diameter side of the flange extending from said input shaft 60. Between the outer peripheral side of a supporting member which fixes the ring gear 90R and the casing 25, there is interposed the reverse brake B2 which consists of another multiple-disk brake.

In said operating section 50, an actuator unit 51 is provided, the low-coast & reverse brake B1 and the high clutch C2 being located on one side of the actuator unit 51 and the reverse brake B2 and the forward clutch C1 are located on the opposite side of the actuator unit 51. The actuator unit 51 comprises an actuator unit 51a for a forward/reverse rotation changeover mechanism and another actuator unit 51b for a high/low speed mode changeover mechanism, which are positioned adjacent to each other, and has a motor for the forward/reverse rotation changeover mechanism and another motor for the high/low speed mode changeover mechanism, which are spaced circumferentially by a predetermined distance. These motors comprise a commutator motor, a rotating-field type motor such as a step motor, and an electric motor such as a servo-motor or ultrasonic motor, and are respectively associated with holding means, comprising an electromagnetic brake, for example, for holding the motors at predetermined rotational positions.

Ball screw mechanisms 52 and 53 for the forward/reverse rotation changeover mechanism and the high/low speed mode changeover mechanism, respectively, have their female screws fixedly provided on the casing 25, and have their male screws engaged with each other via the output gears of said motors, with a connecting member being connected to each of the male screws. The connecting member connected to the bass screw mechanism 52 for the forward/reverse rotation changeover mechanism will engage said forward clutch C1 when being moved in one axial direction and will engage said reverse brake B2 when being moved in the opposite axial direction. On the other hand, the other connecting member connected to the ball screw mechanism 53 for the high/low speed mode changeover mechanism will engage the high clutch C2 when being moved in one axial direction and will engage said low-coast & reverse brake B1 when being moved in the opposite axial direction.

As shown in FIGS. 1 and 2, the belt drive continuously variable speed transmission 1 comprises a primary pulley 5, a secondary pulley 6 and a belt 7 wound around these pulleys 5 and 6, with each of the pulleys 5 and 6 comprising a fixed sheave 5a, 6a and a movable sheave 5b, 6b. The fixed sheave 5a of the primary pulley 5 is rotatably supported on the casing 25 by means of a roller bearing 30, a pressure adjusting cam mechanism 9 being interposed between the backside of the fixed sheave 5a and a flange 2a which extends radially outwardly from the proximal end of the primary shaft 2. The pressure adjusting cam mechanism 9 generally comprises two portions: a fixed cam portion 9a which is connected through the primary shaft 2 to the carrier 90C of said dual planetary gear mechanism 90 and which is prevented from moving in axial directions by said flange 2a, and a movable cam portion 9b which is spline-connected to the fixed sheave 5a and which abuts against such sheave 5a via a disc spring, with rollers being interposed between these cam portions 9a and 9b. This mechanism 9 will impart to the fixed sheave 5a an axial force which corresponds to the torque transmitted. The movable sheave 5b is only slidably supported on the hub of the fixed sheave 5a via a ball spline (linear ball bearing) 31, with a ball screw mechanism 10 being provided on the backside thereof.

The ball screw mechanism 10 comprises a male screw portion 10a and a female screw portion 10b, the rear end of the male screw portion 10a being fixed to an adjustable intermediate member 26 which is supported and restrained by a shoulder of the casing 25 from moving in axial and radial directions. The adjustable intermediate member 26 follows the hub of the fixed sheave 5a by means of a roller bearing 33 so as to rotatably support the primary shaft 2, while it engages with a worm 34 such that it is rotated following the operation of the worm 34 so as to rotate the male screw portion 10a into the female screw portion 10b, whereby the initial tension and the running center of the belt 7 can be adjusted. An automatic aligning mechanism 15 is fixed to the female screw portion 10b. A first thrust ball bearing 12 is interposed between the automatic aligning mechanism 15 and the backside of said movable sheave 5b. The thrust ball bearing 12 has a multitude of balls 12 held in a cage 12c which, on one side, directly abut against respective recesses formed in the backside of the movable sheave 5b and, on the opposite side, abut against the race 12a. The race 12a has a spherical convex surface on the opposite side, which surface is in tight contact with a spherical supporting surface 15a of the automatic aligning mechanism 15. The spherical supporting surface forms a concave surface which has a focus located at the center of the primary shaft 2 and which is inclined downward. The automatic aligning mechanism 15 also has a projecting portion which extends obliquely along said spherical supporting surface 15a, a gear portion 15b formed at the distal end of the projecting portion, and a key fixing portion 15c which is fixed to said female screw portion 10b so as to rotate and axially move with the female screw portion 10b.

Between the backside of the movable sheave 5b and a support plate 35 which is prevented from moving in axial directions by the inner race of the roller bearing held by said adjustable intermediate member 26, there is provided an elastic urging member 36 comprising a predetermined number of disc springs, which urging member will carry part of the belt squeezing load so as to reduce the load to be carried by said ball screw mechanism (mechanical actuator) 10 and the bearing 12. A flange 17 is fixedly screwed to the front end of the primary shaft 2 and a second automatic aligning mechanism 22 is fixed to the flange 17. The automatic aligning mechanism 22 provides a convex surface directed obliquely outward and has a spherical supporting surface 22a which has a focus located at a point on an extension of the center line of the shaft 2. Between the automatic aligning mechanism 22 and the backside of said adjustable intermediate member 26, there is interposed a second thrust ball bearing 20, which has a multitude of balls 20b held in a cage as well as a race 20a. The balls 20b directly abut against recesses formed in the backside of the adjustable intermediate member 26, while the race 20a abutting the balls on the opposite side has a spherical concave surface which is in tight contact with the spherical supporting surface 22a of said automatic aligning mechanism 22.

The fixed sheave 6a of the secondary pulley 6 is made integral with the secondary shaft 3 and is rotatably supported on the casing 25 via a roller bearing 37, while the movable sheave 6b is only slidably supported on the secondary shaft 3 via a ball spline 31'.

Further, on the backside of the movable sheave 6b there is arranged a ball screw mechanism 11 whose male screw portion 11a is fixed to an adjustable intermediate member 27 which is similar to said adjustable intermediate member 26. Thus, the adjustable intermediate member 27 will support the secondary shaft 3 via a roller bearing 33' while at the same time will cooperate with said adjustable intermediate member 26 on the side of said primary shaft so as to adjust the initial tension and the running center line of the belt 7 depending on the rotation of the worm 34'. In addition, as on the primary shaft, a (first) automatic aligning mechanism 16 is fixed to the female screw portion 11b of the ball screw mechanism 11, and a (first) thrust ball bearing 13 is interposed between the automatic aligning mechanism 16 and the backside of the movable sheave 6b. That is, the automatic aligning mechanism 16 has a concave spherical supporting surface 16a having a focus located at the center line of the secondary shaft 3, and further has a projecting portion extending obliquely along the supporting surface 16a, a gear portion 16b formed at the distal end of this projecting portion, and a splined fixing portion 16c. The thrust ball bearing 13 has balls 13b which directly abut against recesses in the backside of the movable sheave 6b and a race 13a which has spherical recesses being in tight contact with said spherical supporting surface 16a. Further, between a supporting plate 35' fixed to the shaft 3 and the backside of the movable sheave 6b, there is provided an elastic urging member 36' which is similar to the one provided on the side of said primary shaft. The secondary shaft 3 is formed with a bore 3a for receiving a gear shaft 70a therein, and the proximal end of the shaft 3 has an enlarged diameter, with the edge of this enlarged-diameter end extending radially outwardly to form a flange 19. To the front end of the shaft 3, the fixed sheave 6a is fitted via a key K and further a nut 38 is screwed for preventing the fixed sheave 6a from being dismounted from the shaft 3. As on the side of the primary shaft, the flange 19 has a (second) automatic aligning mechanism 23 fixed thereto which has a convex spherical supporting surface 23a having a focus located on an extension of the center line of the shaft 3. Between the automatic aligning mechanism 23 and the backside of said adjustable intermediate member 27, there is interposed a (second) thrust ball bearing 21 which has balls 21b directly abutting against the backside of said adjustable intermediate member 27 as well as a race 21a having a spherical concave surface which is in tight contact with said spherical supporting surface 23a.

In FIG. 1, reference numerals 39 and 39' designate U-shaped grooves formed on top of the fixed sheaves 5a and 6a of the primary and secondary pulleys, respectively, for detection purposes. The number of rotations of the primary and secondary shafts 2 and 3 are detected by electromagnetic sensors $S_1$ and $S_2$ which count the U-shaped grooves 39 and 39', respectively.

An operating device 130 is provided where a triangle is formed by the primary and secondary shafts 2 and 3. The operating device 130 includes first and second operating shafts 131 and 132 supported on the casing 25. A boss having large and small gears 133 and 135 is rotatably supported on the first operating shaft 131, and another large gear 136 is integrally fixed with the same shaft 131. The second operating shaft 132, on the other hand, has another large gear 137 integrally fixed therewith and a boss rotatably supported thereon which has small and large gears 139 and 140. The small and large gears 135 and 136 on the first operating shaft 131 are engaged with the large and small gears 137 and 139 on the second operating shaft 132, respectively.

The operating shafts 131 and 132 have non-circular mutually engaging gears 141 and 142, respectively, fixed at their front end portions projecting the bearing which support them, whereby they are interlocked together in a non-linear relation. The large gear 133 on the first operating shaft 131 is engaged with a gear portion 15b formed on the (first) automatic aligning mechanism 15 on the side of the primary pulley, while the large gear 140 on the second operating shaft 132 is engaged with a gear portion 16b formed on the automatic aligning mechanism 16 on the side of said secondary pulley. As shown in FIG. 2, the large gear 133 on the first operating shaft 131 is engaged with a reduction gear mechanism 143 on the side thereof which is opposite to the side where it meshes with said gear portion, the reduction gear mechanism 143 comprising a multitude of spur gears and meshing with the output gear of an electric motor 29. The electric motor 29, like those previously mentioned in connection with the aforementioned operating section 50, is associated with an electromagnetic brake 145 which can hold the motor 29 at predetermined positions.

As shown in FIG. 2, the single planetary gear mechanism 40 is arranged on the gear shaft 70a which constitutes the second shaft, and its ring gear 40R is connected to the flange on the secondary shaft 3 of the belt drive continuously variable speed transmission 1. The gear shaft 70a has a sprocket 82 integral with the sun gear 40S rotatably supported thereon and has the carrier 40C fixed thereto which rotatably supports a pinion 40p.

A silent chain 83 is wound around the sprocket 82 integral with the sun gear 40S on the second shaft and the sprocket 81 supported on said low one-way clutch F. These sprockets 81 and 82 and chain 83 constitute the transfer device 80.

Said gear shaft 70a, in combination with a gear 71a provided integral therewith, forms the output member 70, and the gear 71a meshes with a gear 71c fixed on an intermediate shaft 72. The intermediate shaft 72 is formed with a small gear 71d which meshes with a ring gear 75a fixed to a differential gear device 75, forming a reduction gear device 71. From the differential gear device 75, right and left front axles 73 extend.

The operation of the embodiment will now be described.

The rotation of the engine crank shaft is transmitted to the input shaft 60 via the fluid coupling 101 when the vehicle having the described transmission mounted thereon; subsequently, however, the rotation is transmitted to the input shaft 60 via the centrifugal lockup clutch 102 and the slip clutch 103. The forward/reverse rotation changeover mechanism consisting of the dual planetary gear mechanism 90 set to its forward or backward position by the actuator 51a of the operating section 50 which engages either the forward clutch C1 or the reverse brake B2, will transmit the rotation of the input shaft to the fixed cam portion 9a of the pressure adjusting cam mechanism 9 as a positive or reversed (or forward or backward) rotation. The high/low speed mode changeover mechanism consisting of the single planetary gear mechanism 40 may be switched between the high and low speed modes "H" and "L" by actuating the actuator 51b of the operating section 50 to engage the high clutch C2 or low-coast & reverse brake B1, on the one hand, and engage the low one-way clutch F or allow this clutch F to overrun, on the other hand.

The torque transmitted to the fixed cam portion 9a of the pressure adjusting cam mechanism 9 is transmitted to the movable sheave 5b of the primary pulley 5 via rollers and the movable cam portion 9b and will impart to the fixed sheave 5a an axial force corresponding to the transmitted torque, whereby an axial force corresponding to the transmitted torque is imparted to the entire belt drive continuously variable speed transmission 1 which is associated therewith through the belt 7. The torque is transmitted from the fixed sheave 5a through the ball spline 31 to the movable sheave 5b, and further to the secondary pulley through the belt 7 which is then squeezed by the axial force corresponding to the axial force imparted by the pressure adjusting cam mechanism 9. Axial reacting forces will then be exerted on the fixed and movable sheaves 5a and 5b by the belt 7, the axial force from the fixed sheave 5a being carried by the flange 2a of the shaft through the pressure adjusting cam mechanism 9. In addition, the axial force from the movable sheave 5b is carried by the flange 17 fixed to the shaft 2 through the thrust ball bearing 12, automatic aligning mechanism 15, ball screw mechanism 10 in a predetermined position, adjustable intermediate member 26, thrust ball bearing 20 and automatic aligning mechanism 22, whereby the axial forces are born by a closed loop acting as tensile stresses on the primary shaft 2. Part of the axial force acting on the movable sheave 5b is transmitted from the backside thereof through the supporting plate 35 and is directly carried by the primary shaft 2, whereby the axial forces acting on the thrust ball bearings 12 and 20 and the ball screw mechanism 10 are reduced.

When one-sided positioning occurs on the movable sheave 5b due to the action of a biasing force from the belt 7 which can arise from slight dispersion in size, for example, of parts or from backlash in fitting parts, automatic adjustment is effected for the race 12a by the spherical supporting surface 15a of the aligning mechanism 15 so that the balls 12b of the thrust ball bearing 12 can abut homogeneously throughout the backside of the fixed sheave 5b. Further, unlike the case of rollers, differences in "abutting diameter" of the balls 12b of the ball bearing 12 will not result in significant differences in their peripheral speed because they are spherical, so that relative sliding movement between the balls 12b and the fixed sheave 5a can be eliminated or reduced. The elimination of or reduction in such relative sliding, in combination with the prevention of the single-sided abutment of the balls 12b, will allow the bearing 12 to have a significantly prolonged life.

Similarly, if one-sided positioning of the primary shaft 2 occurs relative to the adjustable intermediate member 26 supported on a shoulder of the casing 25, automatic aligning is effected for the race 20a by the spherical supporting surface 22a of the automatic aligning mechanism 22 so that the balls 20b of the thrust ball bearing 20 can abut homogeneously throughout the backside of the adjustable intermediate member 26. There is virtually no slide between the balls 20b and the adjustable intermediate member 26. Thus, such automatic aligning and absence of slide will allow the bearing 20 to have a significantly prolonged life.

Torque is transmitted from the belt 7 to the secondary pulley 6, and then to the secondary shaft 3 through the key K and the ball spline 31'. On the secondary shaft 3, the axial reaction force acting on the fixed sheave 6a is directly carried by the shaft 3 by means of the nut 38, while the axial reaction force acting on the movable sheave 6b is carried by the thrust ball bearing 13, ball screw mechanism 11, adjustable intermediate member 27, thrust ball bearing 21 and flange 19, in a manner similar to the case of the primary one. Similarly, part of the axial force acting on the movable sheave 6b is carried by the secondary shaft 3 directly via the elastic urging member 36' and the supporting plate 35'.

If one-sided positioning of the movable sheave 6b occurs, the thrust ball bearing 13 is automatically aligned by the automatic aligning mechanism 16 so that the balls 13b can homogeneously abut against the fixed sheave 6a throughout the backside thereof, in a manner similar to the case of the primary one. Also, if one-sided positioning of the secondary shaft 3 occurs relative to the adjustable intermediate member 27 supported on a shoulder of the casing 25, the thrust ball bearing 21 is automatically aligned by the automatic aligning mechanism 23 so that the balls 21b can abut against the adjustable intermediate member 27 throughout the backside thereof.

When the electric motor 29 is rotated in accordance with a speed-changing command from a controller (not shown), the large gear 133 fitted on the first operating shaft 131 is rotated through the reduction gear mechanism 143, whereby the automatic aligning mechanism 15 and the female screw portion 10b integral therewith are rotated by means of the gear portion 15b meshing with such gear 133. The female screw portion 10b will then be shifted axially relative to the male screw portion 10a which is prevented from rotating by the adjustable intermediate member 26, thereby to shift the movable sheave 5b through the thrust ball bearing 12 and thus modifying the effective diameter of the primary pulley 5 for the belt.

The rotation of said large gear 133 is transmitted to the second operating shaft 132 after being substantially speed-reduced by the small and large gears 135 and 137 meshing together, and from there it is further transmitted to the first operating shaft 131 through the non-circular gears 141 and 142. The rotation of the first operating shaft 131 is increased in speed by the large gear 136, small gear 139 and another large gear 140, and the rotation is transmitted from the large gear 140 to the gear portion 16b of the automatic aligning mechanism 16 on the secondary shaft. The female screw portion 11b integral with the gear portion 16b will rotate with such gear portion 16b relative to the fixed male screw portion 11a so as to shift axially, thereby moving the movable sheave 6b through the thrust ball bearing 13, whereby the effective diameter of the secondary pulley 6 is modified for the belt. Although the distance to which the primary and secondary pulleys 5, 6 will then shift does not linearly correspond to the distance to which the belt 7 shifts, the difference between these distances can be properly compensated for by the transmission of motion through said non-circular gears 141 and 142. For structural reasons, the rotation of these non-circular gears 141 and 142 are limited to one complete rotation. By providing the non-circular gears 141 and 142 on the speed-reduced first and second operating shafts 131 and 132 which can rotate only within a range of 360°, speed-increased rotation can be transmitted to the gear portions 15b and 16b of the primary and secondary shafts, whereby the ball screws can rotate a number of complete rotations. The ball screw mechanisms 10 and 11 can achieve a predetermined stroke with a predetermined lead.

The rotation of the secondary shaft 3 is transmitted from its flange 19 to the ring gear 40R of the single planetary gear mechanism 40, where it is either speed-reduced or simply combined with the rotation transferred thereto by the transfer device 80, and the thus obtained rotation is transmitted to the gear shaft 70a. The rotation of this gear shaft 70a is in turn transmitted to the differential gear device 75 through the reduction gear device 71 and further to the right and left front axles 73.

The embodiment described and shown is applied to a continuously variable speed automatic transmission A in which the belt drive continuously variable speed transmission 1 is combined with a single planetary gear mechanism 40 for changing between a low speed mode and a high speed mode. The embodiment however is also applicable to automatic transmissions of other types, for example, one in which the belt drive continuously variable speed transmission 1 is combined with a torque converter.

In the described example, ball bearings are used as the thrust bearings but roller bearings may be used instead. Further, in the described example, the adjustable intermediate members 26 and 27, thrust ball bearings 20 and 21, and automatic aligning mechanisms 22 and 23 may be omitted, and the invention can be applied only to either one of the primary or secondary shaft. Also, the automatic aligning mechanisms 15 and 16 may be arranged on the movable sheaves 5b and 6b.

As described, in accordance with the present invention, axial forces occurring at the primary and secondary pulleys 5 and 6 are carried by the primary and secondary shafts 2 and 3. Therefore, it allows the casing to be not so robust as that which is adapted to carry extremely large axial forces for maintaining belt-squeezing forces, whereby significant in weight and simplification of structure can be achieved. Further, in accordance with the invention, the thrust ball bearings 12 and 13 arranged on the backsides of the movable sheaves 5b and 6b are supported by the automatic aligning mechanisms 15 and 16, the structure is a closed loop wherein the above-mentioned axial forces are carried by the shafts, and the accuracy of the thrust ball bearings are largely influenced by the structure, but errors in accuracy of the bearings arising from one-sided positioning of the primary and secondary pulleys 5 and 6, for example, may be taken up by the automatic aligning mechanisms 15 and 16. In other words, one-sided abutment of the thrust ball bearings 12 and 13 can be prevented and even abutment can be achieved throughout the entire peripheries thereof, whereby the thrust ball bearings 12 and 13 may be improved in terms of their durability and efficiency.

In addition, the thrust ball bearings 20 and 21 and automatic aligning mechanisms 22 and 23 are interposed between the adjustable intermediate members 26 and 27 and the flanges 17 and 19 of the shafts 2 and 3 to take up errors in accuracy of the shaft 2 and 3 arising from one-sided positioning relative to the adjustable intermediate members 26 and 27, whereby the thrust ball bearings 20 and 21 may also be improved in terms of their durability and efficiency.

When the thrust bearings 12, 13, 20 and 21 are formed by thrust ball bearings, peripheral speed differences due to radial positions (such differences can occur where roller bearings are used) or relative sliding between the balls and contacting surfaces can be avoided, whereby the thrust bearings 12, 13, 20 and 21 can be improved in terms of their durability and efficiency.

Further, when the automatic aligning mechanisms 15 and 16 are arranged to support races 12a and 13a of the thrust ball bearings 12 and 13 which are located adjacent to the mechanical actuators 10 and 11, respectively, screw portions 15b and 16b for mechanical actuators can be formed at the ends of projections which project along recesses formed by the spherical supporting surfaces 15a and 16a of the automatic aligning mechanisms 15 and 16, whereby available space can be efficiently used to render the belt drive continuously variable speed transmission 1 more compact, in particular in relation to axial directions.

Further, when the automatic aligning mechanisms 22 and 23 are arranged to support the races 20a and 21a of the bearings which are located adjacent to the flanges 17 and 19, respectively, these aligning mechanisms 22 and 23 may be of a construction in which their spherical supporting surfaces 22a and 23a are convex surfaces which have a relatively small radial size, whereby the belt drive continuously variable speed transmission 1 can similarly be rendered more compact, in particular in relation to axial directions.

What we claim is:

1. A belt drive continuously variable speed transmission comprising, within a casing:
primary and secondary pulleys, each pulley comprising a pair of axially opposed sheaves supported on a shaft, one of said sheaves of each pair being movable and the other being fixed;
a belt wound around said pulleys;
a pressure adjusting mechanism for imparting an axial force to at least one of said pulleys, said axial force corresponding to torque transmitted; mechanical actuators for axially shifting said movable sheaves of said pulleys;
first thrust bearings having plural races and respectively interposed between said movable sheaves and first ends of said mechanical actuators;

a first automatic aligning mechanism for supporting at least one of the races of each said first thrust bearings; and wherein axial forces occurring at said pulleys are carried by said shafts via said first thrust bearings, said first automatic aligning mechanism and said mechanical actuators.

2. The belt drive continuously variable speed transmission as claimed in claim 1, further comprising:

adjustable intermediate members which abut against second ends of said mechanical actuators and which are radially supported on shoulders of the casing, the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

3. The belt drive continuously variable speed transmission as claimed in claim 2, wherein said second thrust bearings are thrust ball bearings.

4. The belt drive continuously variable speed transmission as claimed in claim 2, wherein said second automatic aligning mechanisms support the races of said bearings which are located adjacent to the flanges, and wherein said second automatic aligning mechanisms have convex spherical supporting surfaces.

5. The belt drive continuously variable speed transmission as claimed in claim 1, wherein said mechanical actuators are ball screw mechanisms.

6. The belt drive continuously variable speed transmission as claimed in claim 1, wherein said first automatic aligning mechanisms support the races of said bearings which are located adjacent to said mechanical actuators, and wherein said first automatic aligning mechanisms have concave spherical supporting surfaces.

7. The belt drive continuously variable speed transmission as claimed in claim 1, wherein said first thrust bearings are thrust ball bearings.

8. A belt drive continuously variable speed transmission comprising:

primary and secondary pulleys, each pulley comprising a pair of axially opposed sheaves supported on a shaft, one of said sheaves of each pair being movable and the other being fixed;

a belt wound around said pulleys;

a pressure adjusting mechanism for imparting an axial force to at least one of said pulleys, said axial force corresponding to torque transmitted;

mechanical actuators for axially shifting said movable sheaves of said pulleys;

first thrust bearings having plural races and respectively interposed between said movable sheaves and first ends of said mechanical actuators;

a first automatic aligning mechanism for supporting at least one of the races of each said first thrust bearings; and wherein axial forces occurring at said pulleys are carried by said shafts via said pressure adjusting mechanism.

9. The belt drive continuously variable speed transmission as claimed in claim 8, further comprising:

adjustable intermediate members which abut against second ends of said mechanical actuators and which are radially supported on shoulders of the casing, the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

10. The belt drive continuously variable speed transmission as claimed in claim 9, wherein said second automatic aligning mechanisms support the races of said bearings which are located adjacent to the flanges, and wherein said second automatic aligning mechanisms have convex spherical supporting surfaces.

11. The belt drive continuously variable speed transmission as claimed in claim 9, wherein said second thrust bearings are thrust ball bearings.

12. The belt drive continuously variable speed transmission as claimed in claim 8, wherein said first thrust bearings are thrust ball bearings.

13. The belt drive continuously variable speed transmission as claimed in claim 2, wherein said first automatic aligning mechanisms support the races of said bearings which are located adjacent to said mechanical actuators, and wherein said first automatic aligning mechanisms have concave spherical supporting surfaces.

14. The belt drive continuously variable speed transmission as claimed in claim 8, wherein said mechanical actuators are ball screw mechanisms.

15. A belt drive continuously variable speed transmission comprising:

primary and secondary pulleys, each pulley comprising a pair of axially opposed sheaves supported on a shaft, one of said sheaves of each pair being movable and the other being fixed;

a belt wound around said pulleys;

a pressure adjusting mechanism for imparting an axial force to at least one of said pulleys, said axial force corresponding to torque transmitted;

mechanical actuators for axially shifting said movable sheaves of said pulleys;

first thrust bearings having plural races and respectively interposed between said movable sheaves and first ends of said mechanical actuators, a first automatic aligning mechanism for supporting at least one of the races of each said first thrust bearing, and wherein axial forces occurring at said pulleys are directly carried by said shafts.

16. The belt drive continuously variable speed transmission as claimed in claim 15, further comprising:

adjustable intermediate members which abut against second ends of said mechanical actuators and which are radially supported on shoulders of the casing, the adjustable intermediate members rotatably supporting the shafts;

a flange at one end of each shaft;

second thrust bearings, each having a plurality of races and being interposed between the adjustable intermediate members and a flange; and, a second automatic aligning mechanism supporting at least one of the races of each said second bearing.

17. The belt drive continuously variable speed transmission as claimed in claim 16, wherein said second thrust bearings are thrust ball bearings.

18. The belt drive continuously variable speed transmission as claimed in claim 16, wherein said second automatic aligning mechanisms support the races of said bearings which are located adjacent to the flanges, and wherein said second automatic aligning mechanisms have convex spherical supporting surfaces.

19. The belt drive continuously variable speed transmission as claimed in claim 15, wherein said first thrust bearings are thrust ball bearings.

20. The belt drive continuously variable speed transmission as claimed in claim 15, wherein said mechanical actuators are ball screw mechanisms.

21. The belt drive continuously variable speed transmission as claimed in claim 15, wherein said first automatic aligning mechanisms support the races of said bearings which are located adjacent to said mechanical actuators, and wherein said first automatic aligning mechanisms have concave spherical supporting surfaces.

* * * * *

UNITED STATES PATENT AND TRADEMARK OFFICE
CERTIFICATE OF CORRECTION

PATENT NO. : 4,973,288

DATED : November 27, 1990

INVENTOR(S) : SAKAKIBARA et al

It is certified that error appears in the above-identified patent and that said Letters Patent is hereby corrected as shown below:

Col. 14, line 22, delete "2" and insert --8--.

Signed and Sealed this

Nineteenth Day of October, 1993

Attest:

BRUCE LEHMAN

*Attesting Officer*     Commissioner of Patents and Trademarks